(No Model.)
F. M. PECK & G. R. CASE.
VACUUM APPARATUS.
No. 461,925. Patented Oct. 27, 1891.
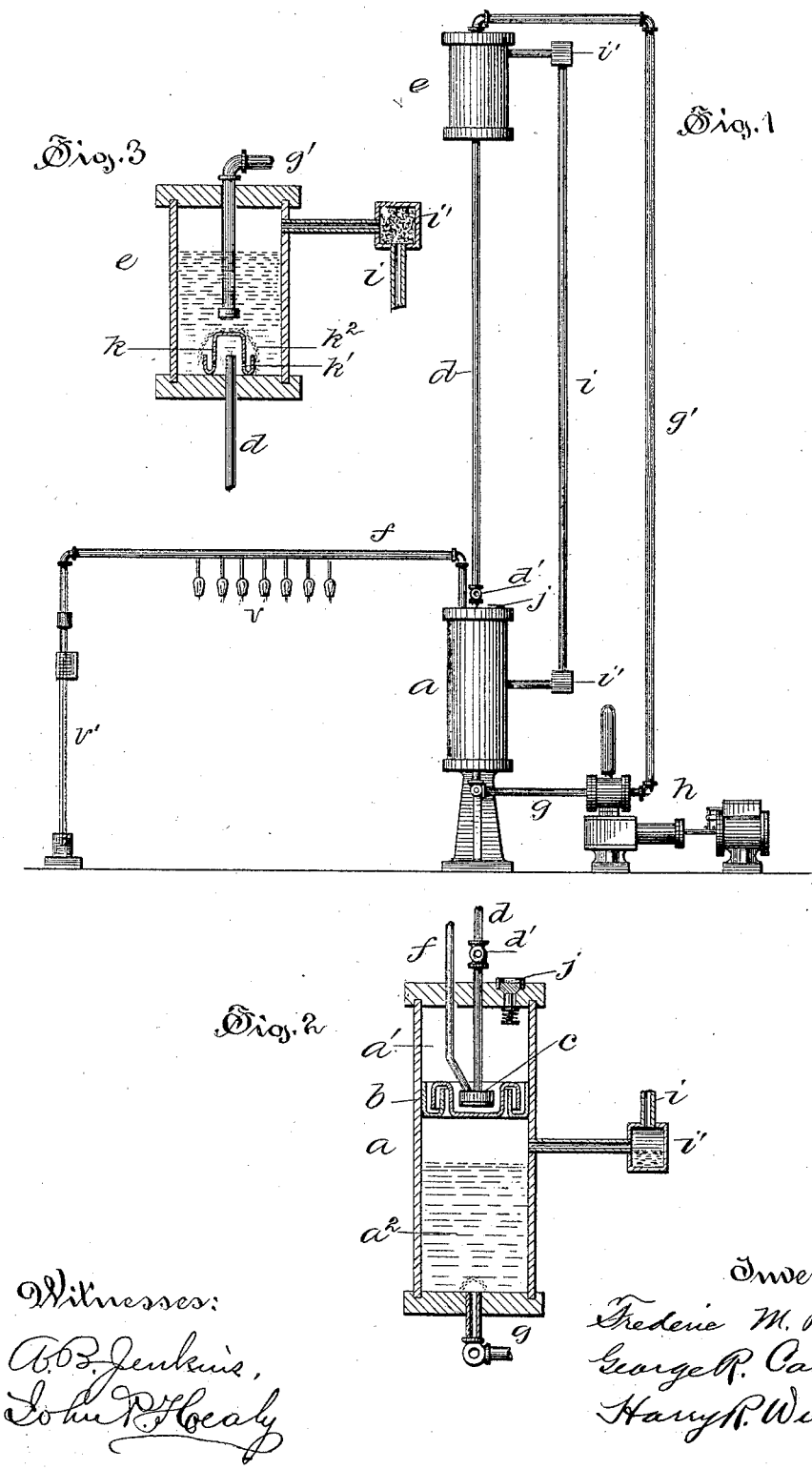
Witnesses:
A. B. Jenkins,
John P. Healy
Inventors,
Frederic M. Peck &
George R. Case, by
Harry R. Williams
Atty.

UNITED STATES PATENT OFFICE.

FREDERIC M. PECK AND GEORGE R. CASE, OF HARTFORD, CONNECTICUT.

VACUUM APPARATUS.

SPECIFICATION forming part of Letters Patent No. 461,925, dated October 27, 1891.

Application filed February 4, 1891. Serial No. 380,187. (No model.)

*To all whom it may concern:*

Be it known that we, FREDERIC M. PECK and GEORGE R. CASE, citizens of the United States, residing at Hartford, in the county of Hartford and State of Connecticut, have invented certain new and useful Improvements in Vacuum Apparatus, of which the following is a full, clear, and exact specification.

The invention relates to the class of apparatus which utilize a flowing liquid for removing air and other gases from vessels; and the object is to so construct such an apparatus that the exhausting-liquid, preferably mercury, is sealed from the atmospheric air to prevent its absorption of vapor, so as to insure an even humidity, and so filtered of air, moisture, and foreign matter as to secure a continuous stream of liquid of uniform density as it passes to the air-pump, whereby vessels, as incandescent-lamp globes, can be evenly and uniformly emptied of air and other gases rapidly with an economic expenditure of power, regardless of the barometric and hygrometric conditions of the atmosphere.

Referring to the accompanying drawings, Figure 1 is a diagrammatic view of the apparatus. Fig. 2 is a detail sectional view of the pump-chamber and receiving-reservoir, and Fig. 3 is a similar view of the pressure-reservoir.

In the views the letter $a$ indicates a receptacle, which is divided into two chambers by a trap $b$. The upper chamber $a'$ contains an air-pump $c$, that is connected by a pipe $d$, having a cock $d'$ with a pressure-reservoir $e$, and by a pipe $f$ with the vessels $v$ to be emptied of gas; also, a manometer $v'$ for indicating the degree of exhaustion, while the lower chamber $a^2$, which receives the liquid that passes through the air-pump and overflows the trap, is connected by a pipe $g$ with the inlet of any ordinary force or lift pump $h$ the discharge-pipe $g'$, from which leads to a pressure-reservoir $e$, situated at a sufficiently high level to produce the necessary head to give the liquid a suitable velocity in passing through the air-pump to create the desired vacuum.

The air-pump $c$ illustrated is of the class shown and described in Letters Patent No. 435,008, of August 26, 1890, wherein the exhausting-liquid in its flow is deflected by a plate and passes from the pump in a thin stratum with great velocity across a narrow opening connected with the exhaust-chamber. The lower chamber $a^2$ is connected with the pressure-reservoir $e$ by an air-tube $i$, which is preferably provided with chambers $i'$, in which any desired vapor or gas absorbent may be placed for drying and purifying the air which passes through this tube from the receiving-reservoir above the liquid-level to the pressure-reservoir above the liquid-level.

The receptacle $a$, which is impenetrable to the outer atmosphere so as to exclude moisture, is provided with a vent $j$, with an outwardly-opening valve to permit the escape of the air and gases which are drawn by the air-pump from the vessels being emptied as the air and gases are given up by the liquid in its attempt to pass the trap $b$. This trap $b$ may be any common arrangement which will require the liquid to rise and fall before passing into the lower chamber $a^2$, and which will hold at all times enough liquid to seal the passage between the chambers.

The pressure-reservoir, which is also sealed from the outer atmosphere, is provided with an air-governor $k$, placed over the outlet from the reservoir to the pipe leading to the pump, so constructed that it will be impossible for the liquid in escaping to form eddies and suck and carry air with it to the pump. This governor preferably consists of an inverted cup resting upon the bottom of the reservoir over the outlet formed of thin metal, with narrow openings $k'$ made through its side walls a little above the bottom edges, which turn up so that the outflowing liquid cannot draw air down the sides and bottom of the reservoir in passing to the pump, as it is of the greatest importance to insure a good vacuum with this class of pumps that no air should pass through it with the liquid. A filter $k^2$ is placed over the governor to prevent the entrance of dust, dirt, and any other particles to the pipe leading to the pump, and of course filters may be located in any of the pipes to clean the liquid, and any suitable absorbents may be placed in any of the pipes or chambers for the removal from the liquid of aqueous and other undesirable vapors which interfere with the production of a vacuum of high degree.

When the vessels to be exhausted are properly attached to the pipe $f$, to which the manometer is joined, the cock $d'$ is opened and the liquid flowing from the pressure-reservoir through the air-pump $c$ withdraws the air and other gases from the vessels and discharges it into the pump-chamber $a'$, from which it escapes to the outer air, when the pressure is sufficient to raise the outwardly-moving valve at the vent $j$. As the liquid passes around the bends in the trap it gives up the gases and passes to the receiving-chamber $a^2$ below, enough liquid always remaining in the trap to seal the lower from the upper chamber. From the lower chamber the liquid is raised by the pump to the pressure-reservoir, so that it may again pass through the air-pump. When the liquid lowers in the pressure-reservoir and rises in the receiving-reservoir, the displaced air in the latter passes through the tube $i$ to the former reservoir, and when more liquid enters the pressure-reservoir the air returns to the receiving-reservoir through the air-balance tube, so that no pressure is generated in either reservoir or outside air allowed to enter. With the so-called "governor" in place over the outlet from the pressure-reservoir the liquid passes in a steady even stream to the air-pump without producing eddies or currents, which tend to suck down air or in any way draw air to the pump which would seriously affect the vacuum formed. As the liquid is not at any time exposed to the outer atmosphere, it cannot absorb moisture and is always of the same density, thereby insuring uniform results.

We claim as our invention—

1. An apparatus for exhausting gases from vessels, which consists of a pressure-reservoir holding the exhausting-liquid, an air-pump connected with the pressure-reservoir and joined with the vessels to be exhausted, a receiving-reservoir surrounding the pump, and an air-tube connecting the two reservoirs, substantially as specified.

2. An apparatus for exhausting gases from vessels, which consists of a pressure-reservoir holding the exhausting-liquid, with an outflow-governor over its discharge-outlet, an air-pump connected with the pressure-reservoir and joined with the vessels to be exhausted, a receiving-reservoir surrounding the pump, and an air-tube connecting the two reservoirs, substantially as specified.

3. An apparatus for exhausting gases from vessels, which consists of a pressure-reservoir holding the exhausting-liquid, an air-pump connected with the pressure-reservoir and joined with the vessels to be exhausted, a receiving-reservoir surrounding the pump, a sealing-trap dividing the receiving-reservoir into two chambers, and an air-tube connecting the two reservoirs, substantially as specified.

4. An apparatus for exhausting gases from vessels, which consists of a pressure-reservoir, an air-pump connected with the pressure-reservoir and joined with the vessels to be exhausted, a receiving-reservoir surrounding the pump, an air-tube connecting the two reservoirs, and a lifting-pump with its inlet connected with the receiving-reservoir and its discharge with the pressure-reservoir, substantially as specified.

5. An apparatus for exhausting gases from vessels, which consists of a pressure-reservoir, an air-pump connected with the pressure-reservoir and joined with the vessels to be exhausted, a receiving-reservoir surrounding the pump, a sealing-trap dividing the receiving-reservoir into two chambers, and a lifting-pump with its inlet connected with the receiving-reservoir and its discharge with the pressure-reservoir, substantially as specified.

6. An apparatus for exhausting gases from vessels, which consists of a pressure-reservoir with an outflow-governor over its discharge-outlet, an air-pump connected with the pressure-reservoir and joined with the vessels to be exhausted, a receiving-reservoir surrounding the pump, a sealing-trap dividing the receiving-reservoir into two chambers, and a lifting-pump with its inlet connected with the receiving-reservoir and its discharge with the pressure-reservoir, substantially as specified.

FREDERIC M. PECK.
GEORGE R. CASE.

Witnesses:
H. R. WILLIAMS,
ARTHUR B. JENKINS.